Oct. 22, 1940.    R. SUCHY ET AL    2,219,059
PROCESS FOR THE PRODUCTION OF METALLIC MAGNESIUM
Filed Nov. 18, 1938
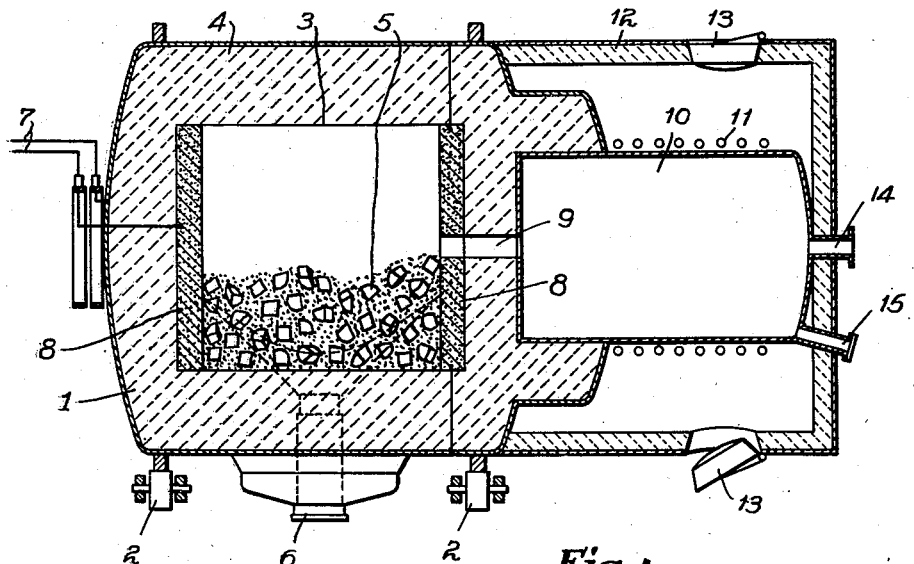
Fig. 1.
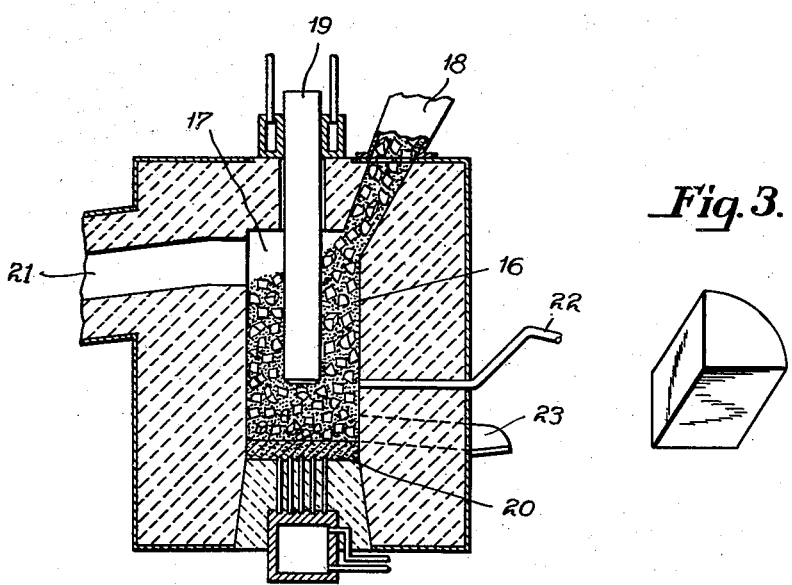
Fig. 2.
Fig. 3.
INVENTORS
Robert Suchy and
Hellmuth Seliger
BY
ATTORNEY Patented Oct. 22, 1940

2,219,059

UNITED STATES PATENT OFFICE 2,219,059

PROCESS FOR THE PRODUCTION OF METALLIC MAGNESIUM

Robert Suchy and Hellmuth Seliger, Bitterfeld, Germany, assignors, by mesne assignments, to Magnesium Development Corporation, a corporation of Delaware Application November 18, 1938, Serial No. 241,163 In Germany December 4, 1937

4 Claims. (Cl. 75—10)

This invention relates to a process for the production of metallic magnesium, of the kind in which magnesiferous raw materials are reduced with the aid of reducing agents, such as silicon, aluminium, calcium silicide, calcium carbide or similar substances furnishing non-gaseous oxidation products, at temperatures below the melting point of the reaction residues.

More particularly, the invention relates to a method of generating the heat required for effecting the reaction in such processes.

In processes of the foregoing kind, considerable technical difficulties are encountered in heating the reaction mixture to the required reaction temperatures of about 1200 to 1450° C. and in maintaining such temperatures in the reaction mixture. It is not possible to supply the requisite heat for this purpose externally through the wall of the reaction chamber in an economical manner and it is therefore necessary to use internal heating. For the latter purpose, heating by radiant heat has been regarded as the most advantageous, but it has, inter alia, the disadvantage that the poor thermal conductivity of the reaction mixture (which of course consists largely of magnesia, which is a well-known heat insulating material) renders it difficult for the heat to penetrate the reaction mixture uniformly.

In the light of the foregoing considerations it would appear that the most favourable method of heating would be one in which the reaction mixture itself acts as heating resistance. However, since the reducing agents which are the only constituents of the reaction mixture having an electrical conductivity comparable to that of metals, are consumed during the reaction, this method would necessitate embedding special resistance members in the mixture. In the latter respect the use of carbon, which is otherwise the most suitable resistance material, would appear to be impossible since, in order to heat the reaction mixture properly, the temperature in the carbon resistors themselves would have to reach a point at which reaction is known to take place between carbon and magnesium oxide which latter is contained in the reaction mixture surrounding said carbon resistors. Carbon monoxide would then be generated which, at the lower temperatures prevailing in the remaining part of the reaction chamber, would react again with the magnesium vapour formed from the reaction mixture and oxidise the same back into magnesia. Thus it would appear to be quite impossible to produce condensable magnesium vapour by this process.

It has however now been observed that loose mixtures of granulated carbon or granulated graphite and pressed pieces of the reaction mixture (comprising magnesia and the reducing agents hereinbefore specified) may be employed directly as electrical resistance for the heating current, without the carbon taking any noticeable part in the reduction at the temperatures required. This is surprising, particularly since as a rule the passage of current through a granular mass involves the production of small arcs at the points of contact of the grains, so that the temperature at such points would be expected to reach the level at which magnesia is reduced by carbon. The aforesaid mixtures can, however, be brought to, and kept at, the reaction temperature required for the generation of magnesium vapour, by supplying electrical energy, and after completion of the reaction the carbon granules can be recovered by sifting off from the residue and can be mixed with a fresh batch of reaction mixture.

Based on the foregoing observation the present invention provides, in a process for the production of metallic magnesium of the kind hereinbefore set forth, a method of generating the heat required for effecting the reaction which comprises passing an electric current directly through a mixture of granulated carbon or granulated graphite and moulded bodies of the reaction mixture comprising magnesiferous raw material and reducing agent.

The process of the present invention can be carried out in any suitable type of furnace of which two examples are illustrated by the accompanying drawing. In the drawing:

Fig. 1 is a longitudinal section of a horizontal drum furnace adapted for the practice of the invention;

Fig. 2 is a vertical section of a shaft furnace likewise suitable for the practice of the invention; and Fig. 3 shows a molded body or briquette of the reaction mixture which is charged into the reduction furnace.

With reference to Fig. 1, the revolving furnace 1 rests upon rollers 2 and is provided with the reaction chamber 3. This reaction chamber is lined with a suitable refractory material 4 and contains the charge 5 which is supplied by the feed pipe 6 and which consists of a mixture of granulated carbon and molded bodies containing magnesiferous material and the reducing agent. The electrical current employed to heat the charge is carried by the conductors 7 and the spaced electrodes 8 and through the granulated carbon within the reaction chamber.

The magnesium vapor which is formed by reduction of the magnesiferous material leaves the reaction chamber through the opening 9 and passes into the condensation chamber 10. The condensation chamber may be heated with the heating coils 11, and the jacket 12 is provided to minimize heat losses. By means of the air valves 13 cooling of the condensation chamber may be accelerated when it is desired to condense the magnesium vapor within the chamber. The connecting pipe 14, which is provided at the end of the condensation chamber, is connected with a vacuum pump, not shown, for the purpose of providing a vacuum within the condensation and reaction chambers. The condensed magnesium can be removed from the condensation chamber by means of pipe 15.

This furnace may be turned about its longitudinal axis in known manner, thus constantly insuring uniform contact between the charge and the electrodes and also uniform generation of magnesium vapor from the mixture.

The reaction also may be carried out in a shaft furnace of the type illustrated in Fig. 2. In this furnace the charge 16 is supplied to the reaction chamber 17 through the feeding means 18. The charge, while moving downwardly, is heated to the reaction temperature by an electrical current carried by the oppositely disposed electrodes 19 and 20, the magnesium vapors passing through the outlet 21 to a condenser. A current of a suitable gas, as hydrogen, may be supplied to the furnace chamber by the pipe 22, and the reaction residue may be removed as slag through a suitable tap hole 23.

The hereindescribed process may be carried out either in a current of hydrogen or in vacuo.

The ratio between the carbon and the actual reaction mixture is largely dependent on the grain size of the constituents and is also determined, in part, by the available voltage.

The size of the moulded bodies composed of the reaction mixture may vary within fairly wide limits, although it is advisable not substantially to exceed a maximum diameter of about 20 mms. for the moulded bodies while the grain size of the admixed carbon grains should be regarded as the minimum diameter for the bodies of reaction mixture. About 5 to 10 mms. is the preferable size for the carbon granules, although finer granules may also be employed without disadvantage.

The shape of the moulded bodies is immaterial but it has been found that cylinder quadrants (i. e., shapes obtained by cutting cylindrical bodies along two planes which are at right angles to each other and each of which contains the axis of the cylinder), the height of which quadrants is approximately equal to the radius, are particularly convenient. A molded body having this shape is illustrated in Fig. 3.

As a rule it will be attempted, for reasons of economy, to manage with as small as possible a proportion of carbon. When reducing dolomite with ferro-silicon it is possible, for example, by using 1 part by weight of reaction mixture (preferably in the proportion of approximately 4 mols. of dolomite to 1 atom of silicon) to each part by weight of granulated graphite, to obtain a mixture which is a relatively good conductor of current even in the cold state. Since the resistance of the mixture diminishes as the temperature rises, the addition of carbon may also be smaller if the furnace is already preheated.

We claim:

1. In a process for the production of metallic magnesium, of the kind hereinbefore set forth, a method of generating the heat required for effecting the reaction, which comprises passing an electric current directly through a mixture of granulated carbon and moulded bodies of the reaction mixture comprising magnesiferous raw material and a reducing agent which yields non-gaseous oxidation products.

2. A method in accordance with claim 1, in which the size of the moulded bodies of the reaction mixture does not exceed a maximum diameter of about 20 mms. and does not fall below the grain size of the admixed granulated carbon.

3. A process according to claim 1, in which the grain size of the granulated carbon ranges between about 5 and about 10 mms. in diameter and the size of the molded bodies of the reaction mixture does not exceed a maximum diameter of about 20 mms. and does not fall below the grain size of the admixed granulated carbon.

4. A process according to claim 1, in which the molded bodies of the reaction mixture have the shape of cylindrical quadrants, the height of such quadrants being approximately equal to the cylinder radius.

ROBERT SUCHY.
HELLMUTH SELIGER.